Oct. 24, 1967  J. H. HITCHINS  3,348,634
STORE SERVICE
Filed Aug. 20, 1965  2 Sheets-Sheet 1

INVENTOR.
JOHN H. HITCHINS
BY
ATTORNEYS.

Oct. 24, 1967 J. H. HITCHINS 3,348,634
STORE SERVICE
Filed Aug. 20, 1965 2 Sheets-Sheet 2

INVENTOR.
JOHN H. HITCHINS
BY
ATTORNEYS.

3,348,634
STORE SERVICE
John H. Hitchins, 2964 Peachtree Road NW.,
Atlanta, Ga. 30305
Filed Aug. 20, 1965, Ser. No. 481,275
4 Claims. (Cl. 186—1)

The invention relates to the construction and utilization of a store through which customers' vehicles may move, and more particularly to a construction and method for dispensing articles to a customer in an efficient, rapid and expeditious manner.

Other structures and systems are known to the prior art providing a store whereby the customer does not have to disembark from his vehicle in order to purchase the commodities which he desires. Previous constructions and systems known to the prior art necessitate an attendant following the customer's automobile to receive his verbal orders and retrieve the selected commodities from a rack or the like. These types of systems necessitate a large number of attendants milling about the display racks and the vehicle pathways resulting in the appearance of great confusion and the possibility of numerous accidents because of moving vehicles and walking attendants.

Other disadvantages reside in the structures and systems of the prior art, particularly when the vehicles approach the check-out or cashier's stand. Customarily the movement of vehicles must be halted or slowed in order to allow the cashier to total the purchased goods, package the selected articles and deliver them to the customer. Accordingly, a bottleneck usually results at the check-out stand thus unnecessarily slowing the movement of vehicles through the store. A concomitant disadvantage resides in these constructions when the vehicles are propelled through the store by a continuously moving belt or the like since the customer will either be propelled past the cashier's stand prior to the completion of the cashier's duties or the entire line of vehicles must be stopped resulting in the disruption of the purchasing process and aggravation of customers.

It is an object of the instant invention to provide store service in which a customer's vehicle may be moved along a predetermined path on which is displayed a selection of articles for sale.

Another object of the instant invention is to provide store service in which a customer may utilize a remote communications system to transmit an order to an attendant at a distant location thus avoiding the accident hazards created by a plurality of attendants moving about in the pathway of a customer's automobile.

Still another object of the instant invention is to provide store service in which a customer's vehicle moves through the store along a predetermined pathway with the bulk of commodities vended being located at a distant location.

A further object of the instant invention is to provide a grocery cart for use by store attendants being equipped with a radio receiver and an adding machine such that the attendant may receive the customer's selection, remove the selection from a storage area, and enter the value of the selection in the adding machine.

A still further object of the instant invention is to provide store service in which a grocery cart is provided for an attendant having an adding machine producing two copies of the tabulation of the customer's order such that one copy may be given to an individual at a cashier's station and the other copy being given to the customer.

Another object of the instant invention is to provide a motivating means for moving a customer's vehicle along a predetermined pathway adjacent a plurality of display counters from which the customer may make a selection.

A still further object of the instant invention is to provide a radio or induction transmitter to be given to a customer or releasably secured to his vehicle for transmitting the customer's order to an attendant at a remote location.

Other objects and advantages of the instant invention reside in the combinations of elements, arrangements of parts, and features of construction, utilization and operation, all as will be more fully pointed out hereinafter and disclosed in the accompanying drawings wherein there is shown a preferred embodiment of this inventive concept.

Figure 4:
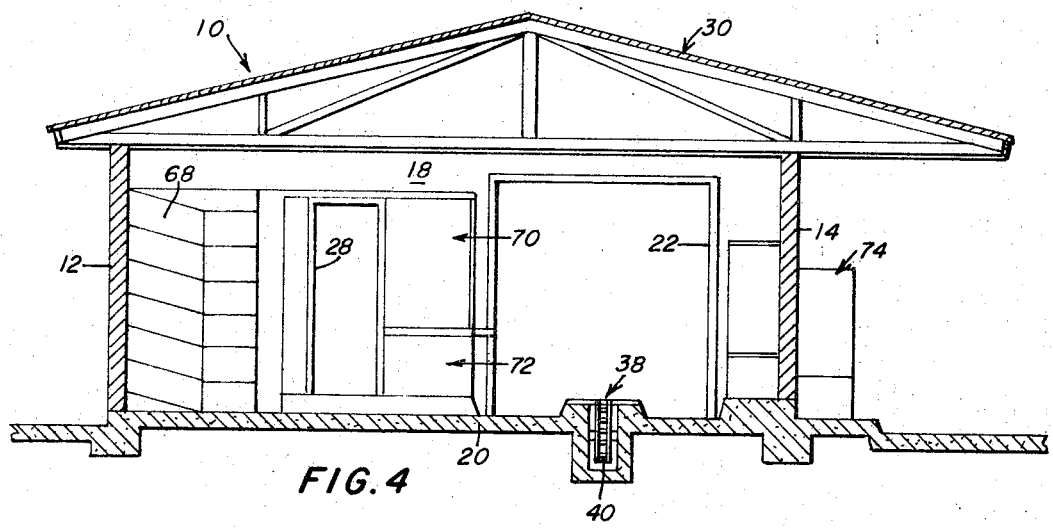
FIGURE 4 is another cross-sectional view of the store of FIGURE 1 taken along line 4—4 and viewing in the direction of the arrows.

Referring now to the drawings in detail, wherein like reference characters designate like elements throughout the several views thereof, there is indicated generally at 10 a store building having longitudinal exterior walls 12, 14, and transverse exterior walls 16, 18 suitably secured to a concrete foundation 20. The transverse exterior walls 16, 18 include a customer vehicle entrance 22, a customer vehicle exit 24, an attendant entrance 26 and an attendant exit 28 with a conventional roof structure indicated generally at 30 spanning walls 12, 14, 16, 18 in a conventional manner. It will be seen in FIGURE 4 that roof 30 extends substantially beyond exterior wall 14 for purposes which will be more fully explained hereinafter.

An interior longitudinal wall 32 separates a customer area designated generally at 34 from a storage area shown generally at 36. Positioned in customer area 34 and extending between vehicle entrance 22 and vehicle exit 24 is an endless chain propelling device indicated generally at 38 including a chain 40 rotatably mounted by a series of shafts 42 in a pit 44 in foundation 20. A suitable driving means, such as an electric motor operably connected as by toothed gears to chain 40 moves chain 40 about its predetermined course. A plurality of vehicle engaging bars 46 are provided on chain 40 and are preferably mounted thereon for pivotal movement in a clockwise direction, as may be seen in FIGURE 2, from a vertical position to a substantially horizontal position. Bars 46 are secured against pivotal movement in a counter-clockwise direction from a vertical position to a horizontal position and are preferably spring biased to the horizontal position.

Figure 2:
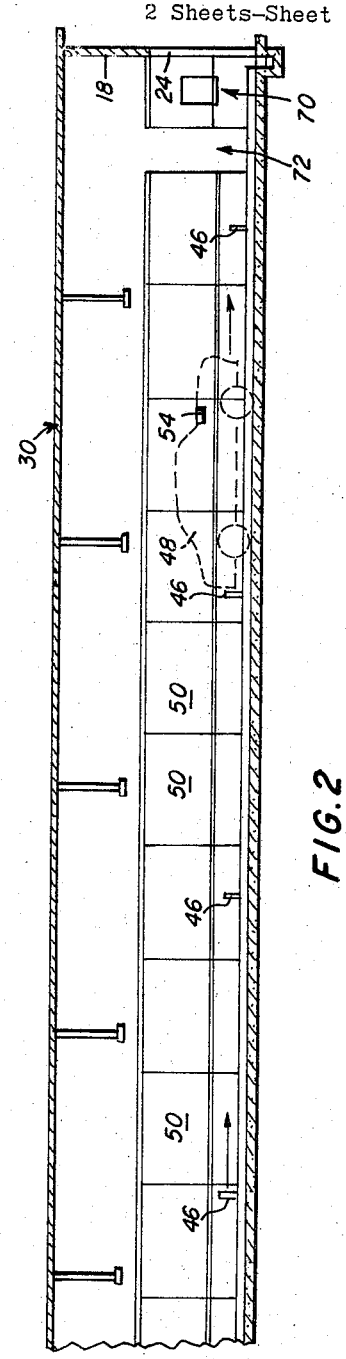
FIGURE 2 is a longitudinal cross-sectional view of the store of FIGURE 1 taken along line 2—2 and viewing in the direction of the arrows, certain parts being broken away for clarity of illustration.

When a customer's vehicle 48 enters entrance 22 it is propelled by its own motivating power across at least one of vehicle engaging bars 46 thus camming it in a clockwise direction as seen in FIGURE 2. When automobile 48 passes bar 46, bar 46 will be rotated in a counter-clockwise direction to a vertical position at which time the vehicle driver may cease forward motion of the vehicle. The movement of chain 40 will translate bar 46 until it engages the rear bumper of vehicle 48 at which time vehicle 48 will be moved toward the right as seen in FIGURE 2. As more fully explained hereinafter, the driver while still seated within the vehicle 48 will be propelled past a plurality of display cases from which he may make a selection.

Mounted on each side of the predetermined pathway of conveyor 38 is a plurality of display cases 50 in which goods may be stacked within sight of the customer within vehicle 48.

Adjacent the entrance 22 is a bin 52 in which is placed a plurality of signalling means 54, such as a two-way radio or induction signalling device or "walkie-talkie." Signalling means 54 may be picked up by a customer within vehicle 48 or may be releasably attached to the vehicle by an attendant, such as by the use of a magnet on signalling means 54.

Figure 3:
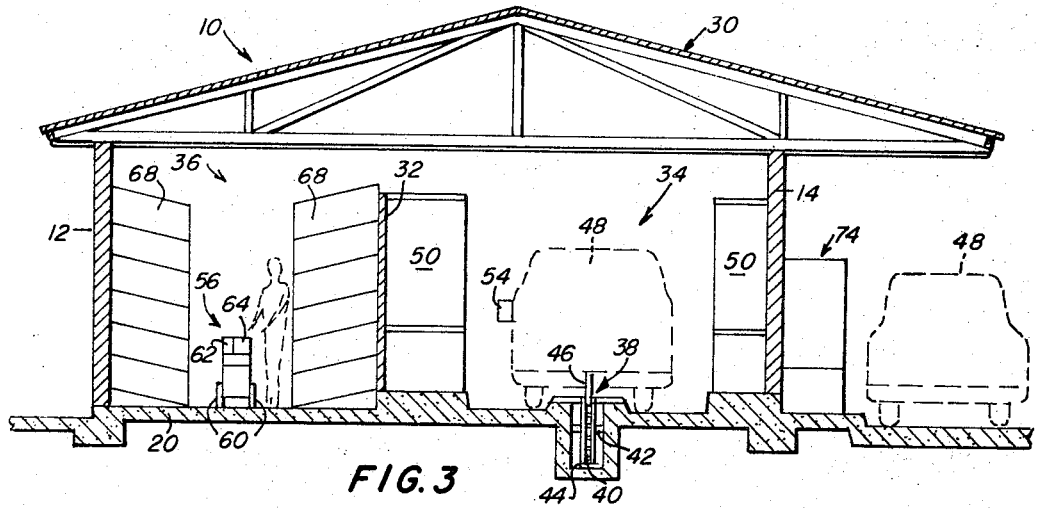
FIGURE 3 is a transverse cross-sectional view of the store of FIGURE 1 taken along line 3—3 and viewing in the direction of the arrows.

The customer will make his selection from the articles displayed in cases 50 and announce his order into radio signalling means 54 as vehicle 48 is moved throughout the distance covered by display cases 50. An attendant, shown in dotted lines in FIGURE 3, is positioned in storage area 56 and provided with an article carrying cart shown generally at 56 having an article carrying receptacle 58 rollably supporting by wheels 60. Cart 56 is provided with a signalling means 62 for receiving transmissions from signalling means 54 associated with vehicle 48. Preferably the broadcasting frequencies of each of signalling means 58 is slightly different from the remainder to avoid the difficulties of intercepted transmissions. Article carrying cart 56 is also preferably equipped with an adding machine 64 of the type that makes two copies of the tabulations entered therein, such as by using carbon paper or other forms of reproducible papers.

Figure 1:
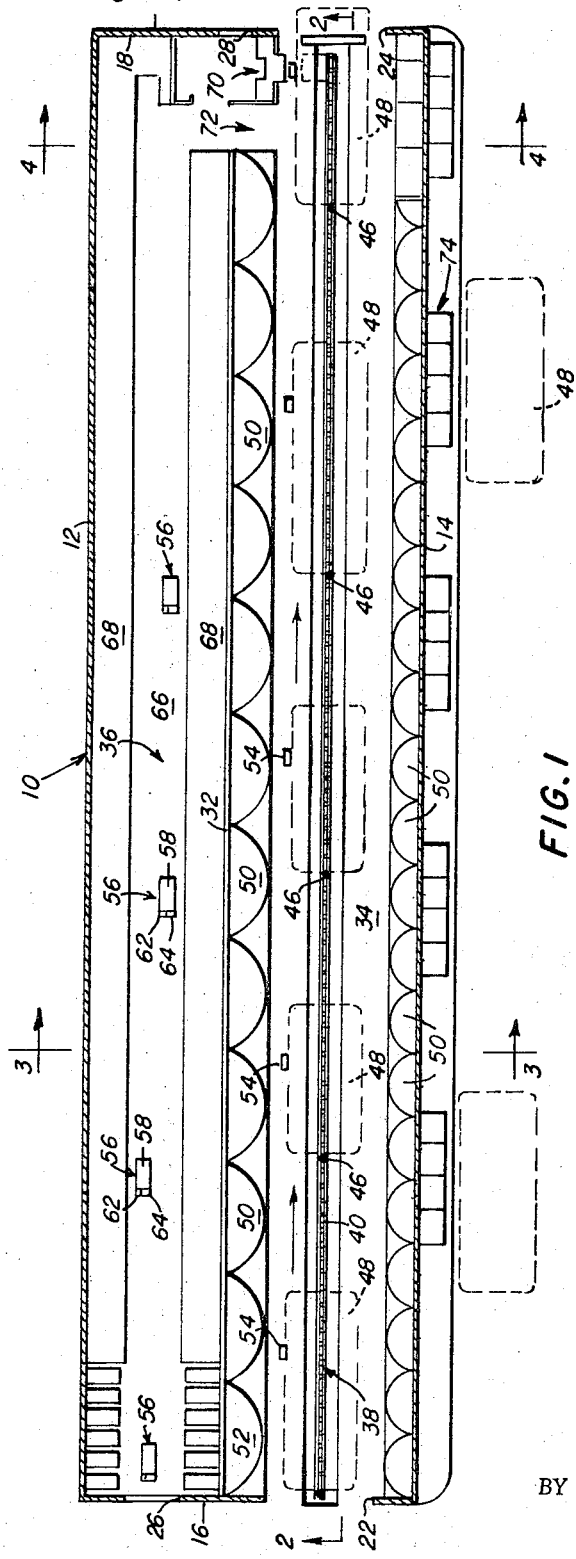
FIGURE 1 is a schematic top plan view of the store of the instant invention, certain parts being broken away for clarity of illustration.

An attendant will be positioned adjacent attendant entrance 26 so that when a vehicle enters entrance 22 the attendant may parallel the movement of vehicle 48 along an aisle 66. The customer will transmit his order through signalling means 54 which will be received by the attendant through signalling means 62. The attendant will remove the ordered article from its location on an appropriate storage shelf 68. It should be noted that the articles displayed in cases 50 will be stored immediately therebehind such that when the customer orders articles displayed in cases from left to right as seen in FIGURE 1, the attendant may retrieve the ordered articles while traveling down aisle 66.

It will be seen that when customer vehicle 48 reaches the end of conveyor 38, adjacent which is located a cashier's station shown generally at 70, and an article exchanging area indicated generally at 72, the attendant will almost simultaneously arrive. One copy of the tabulation of goods may be presented to the cashier with the other copy being presented to the customer along with the selected articles.

It is preferable that the attendant package the selected goods immediately after retrieving them from storage shelves 68 concurrently with the tabulation of the value thereof on adding machine 64. If such a procedure is followed, it will be seen that the customer will arrive at cashier station 70 almost simultaneously with his packaged and tabulated articles. The attendant may place the purchased articles in vehicle 48 while the customer is settling with the cashier.

Before the customer drives away, the attendant may retrieve transmitter 54 and return to attendant's entrance 26 and place signalling means 54 in bin 52 or await the next customer. It will be seen that a few employees may efficiently and rapidly cater to a large number of customers providing rapid service thereto.

A separate lane of customer travel is provided exteriorly of wall 14 under the overhang of roof 30. A plurality of vending machines shown generally at 74 carry a small number of goods which have the common characteristic of repeated weekly sales, such as milk, bread, cigarettes or the like. Each of vending machines 74 is preferably provided with a bill changer which may alternatively be placed adjacent the entrance end of building 10. It will be seen that the exterior lane of customer travel is partially protected from the weather such that the driver may frequent vending machines 74 without having to undergo the discomforts of rain or snow. Likewise, the use of customer area 38 interiorly of building 10 provides similar advantages.

Figure 5:
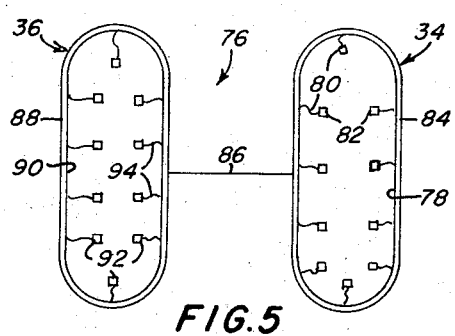
FIGURE 5 is a schematic view of one form of communication system between a customer area and an article storage area.

Another embodiment of the remote communications system of the instant invention is shown generally at 76 in FIGURE 5 including an oval-shaped belt 78 carrying, by an expansible cord 80, a plurality of telephones 82. Each of the telephones 82 is connected with a single wire positioned in a stationary complementarily shaped raceway 84 and connected through a coaxial wire 86 to a second stationary raceway 88. Stationary raceway 88 carries a plurality of peripheral wires (not shown) each of which is connected by a brush (not shown) to a movable raceway 90 and connected to a telephone 92 by expansible cord 94. Movable raceway 78 will be positioned in customer area 34 with movable raceway 90 being positioned in storage area 36. Both of movable raceways 78, 90 will be mounted in the ceiling of building 10 with raceway 78 being positioned in customer area 34 with telephones 82 descending to a height convenient for an automobile driver to grasp while seated in his vehicle. Raceway 90 will be positioned over storage area 36 such that an attendant therein may pick up one of telephones 92 and be in communication with a single corresponding telephone 82 within customer area 34.

It will be seen that when a customer enters customer area 34 he may grasp telephone 82 adjacent the window of his vehicle and be in communication with a telephone 92 within storage area 36. Any suitable scheme may be provided to insure that attendants within storage area 36 may readily find the telephone which the customer is using. The telephones in use will be oscillated back to their original position by a movement of movable raceways 78, 90 thus obviating the necessity of an attendant retrieving a radio transmitter. A suitable power source and ground for the telephone system may be provided where convenient.

It is now seen that there is herein provided an improved store having all of the objects of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

I claim:
1. A drive-in store comprising a customer area, means for moving a customer's vehicle along a predetermined path within said customer area, means displaying a plurality of articles along a portion of said predetermined path, a storage area within said store and remotely located with respect to said customer's area, cart means disposed within said storage area for receiving articles selected by said customer, a remote communications system providing communication between said customer area and said storage area, said communications system including portable transmitter means carried on said vehicle in said customer area and portable receiver means carried on said cart, and an article exchanging area for delivering selections made by the customer to said vehicle.

2. The structure of claim 1 wherein said communications system includes portable radio transmitter and receiving means.

3. The structure of claim 1, and an adding machine carried on said cart.

4. The structure of claim 1 wherein said portable transmitter means is removably carried on said vehicle.

References Cited

UNITED STATES PATENTS

| | | | |
|---|---|---|---|
| 1,625,490 | 4/1927 | Morris | 186—1 |
| 1,795,365 | 3/1931 | Hackle | 186—1.3 |
| 2,649,930 | 8/1953 | Purdy | 186—1.3 |
| 3,157,871 | 11/1964 | Umanoff | 280—33.99 |
| 3,251,543 | 5/1966 | Bush | 280—33.99 |
| 3,263,776 | 8/1966 | Kroemer | 186—1 |

OTHER REFERENCES

"Oil Power Article," page 8.

EVON C. BLUNK, *Primary Examiner.*

H. C. HORNSBY, *Assistant Examiner.*